United States Patent Office 2,755,249
Patented July 17, 1956

2,755,249

HALOGENATED HYDROCARBON-TREATED GREASES

David W. Young, Roselle, Arnold J. Morway, Rahway, and Henry J. Franklin, Linden, N. J., assignors to Esso Research and Engineering Company, a corporation of Delaware No Drawing. Application December 1, 1951, Serial No. 259,486

2 Claims. (Cl. 252—42.1)

The present invention relates to an improved lubricating grease and particularly to a relatively firm and hard grease prepared in a novel manner. The invention is especially applicable to the so-called "block" greases but is not limited thereto and may be applied to other greases where a relatively hard and firm consistency is desirable. While of particular utility with the soda base greases, the invention is applicable also to lime greases, lithium greases, barium greases, aluminum greases and to greases containing a mixture of two or more of the soaps of sodium, lithium, calcium, barium and aluminum.

Conventional lubricating greases consists primarily of lubricating oil thickened to a more or less firm and solid consistency with a soap which has limited solubility in the oil. In general, hardness or "consistency" increases with soap content. Electron photomicrographs of some of such greases show that the soap is commonly of reticulate or fibrous construction, holding the oil in a solid "structure." Various means have been devised to modify the soap structure, e. g. by mixing different kinds of soaps, by homogenization or severe mechanical working, by forming a complex of the soap with a salt of lower molecular weight, etc. Greases of various properties have been so produced, some of them giving satisfactory performance at unusually high temperatures and having physical or structural stability, etc. It should be emphasized that these prior treatments and modifications have dealt largely with the soap structure and have not particularly affected the oil. In these ways the consistency of the grease under various conditions has been affected.

The present invention is a departure from previous efforts to improve grease structure in that it tends to change the character of the oil itself. It should be noted that grease lubrication has long proceeded upon the general theory that the oil in the grease accomplishes most of the actual lubrication and hence should be of such viscosity, viscosity index, etc., as would be used for liquid lubrication of the same parts if liquid lubrication were feasible. (Greases usually are employed only where leakage, dirt, and related considerations make the use of a liquid lubricant impractical.) Hence the prior art has assumed that the oil in a grease should be unmodified; therefore, any improvements in consistency, structure, etc., should be obtained by modification of the soap.

According to the present invention, a conventionally prepared lubricating grease, for example a soda base grease composed primarily of mineral base lubricating oil containing about 5 to 30 or 40% by weight of soda soap of higher fatty acids (in the $C_{12}$ to $C_{24}$ range, usually around $C_{16}$ to $C_{22}$ or so), is modified by heating it with a highly halogenated lower paraffin. Carbon tetrachloride is the preferred treating agent though the tetrabromide may be used. Hexachlorethane or hexabromethane may also be used, or monochlor-tribromo-, dichlor-dibromo-, or trichlor-monobromo-methane.

While the exact mechanism of the reaction is not fully understood it is believed that the reaction results in a loose condensation of the molecules of the oil in the grease, greatly increasing its consistency for a given soap content. The effect superficially is much like the effect of using a very viscous oil instead of the normally used lubricating oil. In use, however, the hardened grease resulting from the treatment with the halo-paraffin, has the usual lubricating properties of the lighter oil. The net effect is to achieve the production of a relatively very firm and hard grease, e. g., a block grease, containing only those proportions of soap normally used for the softer greases. Since the treatment of the present invention is accompanied by evolution of the dry hydrohalide, it is believed that a reaction proceeds about as indicated:

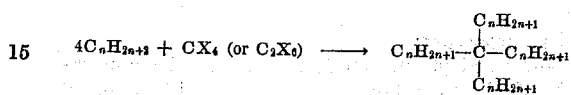

where X is a halogen, preferably chlorine.

Hence the oil is very appreciably thickened but the grease structure, or the physical structure of its normally liquid component, is not so stable but what it can break down to some extent, on contact with the metal surfaces to be lubricated (which are commonly at elevated temperature) to give the lubricating properties of the usual lighter oils.

It should be emphasized that the foregoing analysis is merely a hypothesis. In any event, the discovery appears to be important that the fully halogenated methanes and ethanes, noted for their inactivity and widely used as oil solvents, should become highly active and produce remarkable changes in grease structure.

It will be appreciated also that the invention is not limited in its broader aspects to treatment of lubricating greases. Lubricating oils per se may be thickened or increased in viscosity by the treatment though, as will be perceived from the above discussion, they will not be fully equivalent to normal oils of equal viscosity. Asphaltic compositions and other hydrocarbon materials may likewise be so treated although such treatment for special products forms no part of the present invention.

The invention will be more fully appreciated by reference to the following specific examples.

*Example I*

A soda base grease containing about 28% by weight of the soda soap of rapeseed oil and about 72% of mineral base lubricating oil of about 500 S. S. U. viscosity at 210° F. was tested in the Standard A. S. T. M. grease penetrometer and found to have a penetration value of 200 mm./10. This is a grease of about medium hardness.

100 grams of the grease just described was heated to 310° C. and stirred with three grams of carbon tetrachloride for one hour. The reaction was carried out in a three necked flask fitted with a reflux condenser, water cooled. At about 300° C. the carbon tetrachloride, considered very inert at ordinary temperatures, began to react with the grease. The reaction liberated hydrogen chloride as a dry gas. At the end of the reaction the grease was found to be free of carbon tetrachloride. It had no measurable residual acidity.

The reaction may be conducted at normal pressure, using a reflux system, at temperatures of about 300 to 350° C. If pressure is used the reaction may be carried out at 200° to 350° C. The time of reaction may vary from 10 minutes to 10 hours, 15 minutes to an hour being preferred. Reaction should be reasonably complete.

*Example II*

100 g. conventional grease as in Example I
3 g. α chloromethyl ethyl ether

The mixture was heated to a temperature of 300 to 310° C. for 15 minutes in a steel bomb under pressure.

The final product was brown in color and hard. Physical properties of the final grease:

Penetration:
- Unworked _____ 28 mm./10.
- Worked _____ 75 mm./10.
- Dropping point _____ 500° F.
- Product very water soluble.

*Example III*

100 g. conventional grease as in Example I
6 g. CCl₄

The mixture was heated at 300 to 310° C. for 15 minutes in a steel bomb under pressure. Pressure that developed was due entirely to heating the material. The final product was brown and hard at room temperature.

Physical properties:
- Unworked penetration _____ 75 mm./10.
- Worked penetration _____ 125 mm./10.
- Dropping point _____ 380° F.
- Product water insoluble up to 150° F.

Although carbon tetrachloride is preferred as a reactant other halogenated, especially chlorinated, hydrocarbons and oxygenated hydrocarbons can be used, but they are preferably fully or quite fully halogenated. Hence hexachlorethane is next choice to carbon tetrachloride for this purpose. The related halogenated ethers may be used also as shown in Example II.

Proportions of reactants may vary but it is preferred to use about 1 to 5% by weight of the halogenated compound based on the weight of the grease being treated. Usually all of the latter should be reacted or removed but a small residue may be permitted to remain where the lubricant is to be used under extreme pressure conditions and where corrosion can be tolerated to a small degree.

The foregoing type of reaction can be applied to synthetic ester greases as well as those containing mineral oil as the liquid constituent. It is applicable to lime greases as well as soda greases and forms a water insoluble calcium grease. As noted above, it may be applied to other types of greases as well. It can even be applied to greases thickened with non-soap thickeners, such as carbon black and silica gel thickeners.

It will be understood also that the greases and related products of the present invention may include the usual amounts of conventional modifiers. Such modifiers may be antioxidants, viscosity index improvers, tackiness agents, extreme pressure additives, metal deactivators, rust or corrosion inhibitors, and other types of well known additives.

What is claimed is:

1. The process which comprises preparing a soda base soap thickened mineral lubricating oil grease of moderate A. S. T. M. penetration value and heating said grease with 1 to 5% of its weight of carbon tetrachloride to a temperature between 200° and 350° C. under pressure for a period of 10 minutes to 10 hours to substantially complete reaction in order substantially to harden said grease and materially reduce its A. S. T. M. penetration value.

2. An improved block grease made by the process of claim 1.

References Cited in the file of this patent

UNITED STATES PATENTS

| | | |
|---|---|---|
| 1,995,371 | Werder _____ | Mar. 26, 1935 |
| 2,178,514 | Prutton _____ | Oct. 31, 1939 |
| 2,386,222 | Lincoln _____ | Oct. 9, 1945 |
| 2,387,999 | Knutson et al. _____ | Oct. 30, 1945 |
| 2,391,113 | Zimmer et al. _____ | Dec. 18, 1945 |
| 2,417,087 | Prutton _____ | Mar. 11, 1947 |
| 2,566,793 | Davies et al. _____ | Sept. 14, 1951 |